Sept. 12, 1967        S. J. RUSK        3,341,155

VECTOR RESOLVER

Filed April 23, 1965        6 Sheets-Sheet 1

INVENTOR
STANLEY J. RUSK

BY Claude Funkhouser
                   ATTORNEY
Lawrence A. Hoffman
                   AGENT

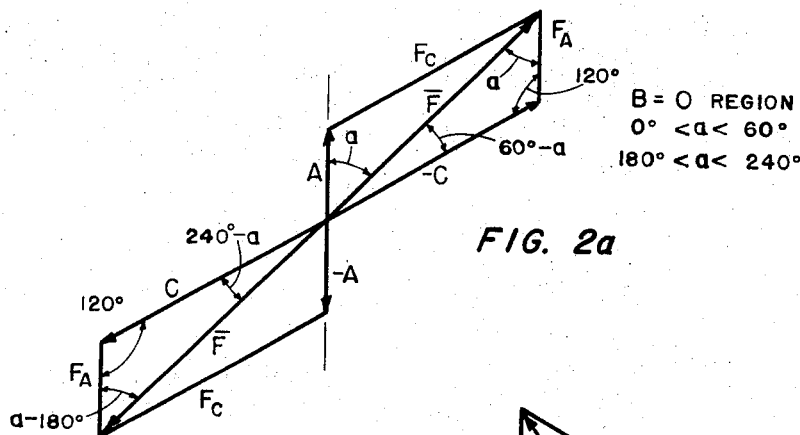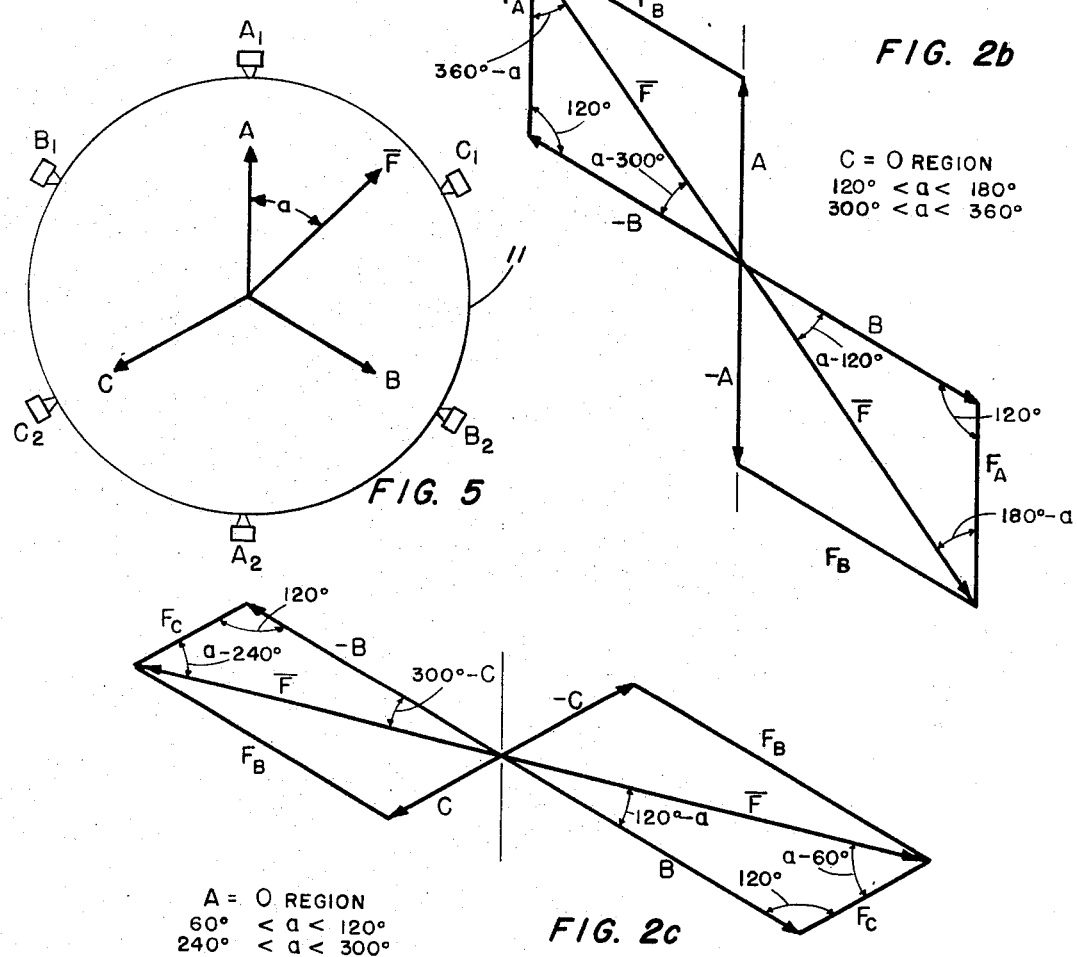

United States Patent Office 3,341,155
Patented Sept. 12, 1967

3,341,155
VECTOR RESOLVER
Stanley J. Rusk, Los Altos Hills, Calif., assignor, by mesne assignments, to the United States of America as represented by the Secretary of the Navy
Filed Apr. 23, 1965, Ser. No. 450,563
35 Claims. (Cl. 244—77)

The present invention relates to thrust vectoring control systems and more particularly to thrust vectoring control systems incorporating improved vector resolution means.

Thrust vectoring for use in the control of rocket propelled vehicles is well known, and a number of configurations for such systems have been proposed.

One such arrangement incorporates a plurality of fluid injectors disposed uniformly about the periphery of the vehicle. Control signals derived from the orthogonal pitch and yaw components of the vehicle motion direct the generation of required forces by selective activation of various fluid injectors.

The number of injectors used in such an arrangement may be arbitrarily chosen, though it may be shown that within practical limits, a large number of injectors will produce the best results in terms of fuel economy and weight saving.

A suitable arrangement then may comprise an array of six injectors located every 60 degrees around the periphery of the vehicle, the orthogonal control components being transformed into suitable components along each of the non-orthogonal axes defined by the 60 degree disposition of the injectors.

A straightforward technique to accomplish this transformation would be to determine the resultant vector force desired (as by any inertial guidance system or by any other suitable means) and then to resolve the vector into appropriate components by direct application of the laws of trigonometry. If, for example, the orthogonal components of the desired vector are available, a simple application of the law of sines to appropriate vector triangles will yield the desired non-orthogonal components.

The above technique suffers from a number of disadvantages which seriously decrease its utility.

For example, as will be shown later, while the trigonometric relationships required for the coordinate transformation are relatively simple, the mechanization of the coordinate transformation system itself is usually quite large and quite complex. Since the more complex a system is, the greater is its tendency toward unreliability, the use of a particular system in a rocket booster warrants every possible effort toward simplification. Unfortunately, vector resolvers of the type in use today are inherently complex and do not admit of substantial simplification. Similarly, the size of presently available systems make them undesirable for use in rocket boosters where space and weight consideration are critical.

Accordingly, it is an object of the present invention to overcome the above mentioned inherent disadvantages of presently available vector resolution systems.

It is also an object of the present invention to expound novel concepts in the art of vector resolution and coordinate transformation, and to provide both a method and means for utilizing these new concepts.

It is further an object of the present invention to provide novel concepts of coordinate transformation and vector resolution, and application and techniques for use thereof, characterized by both mathematical and practical simplicity.

It is further an object of the present invention to apply the concept and technique noted above to the improvement of thrust vector control systems for rocket boosters.

It is further an object of the present invention to provide a rocket booster having thrust vectoring control in which fluid injectors are arranged on non-orthogonal axes, and in which command signals in the form of orthogonal components are directly transformed into non-orthogonal control components for the injectors without the use of trigonometric transformations.

It is a further object of the present invention to provide a thrust vectoring control system having an arbitrary number of fluid injectors in which orthogonal command components are directly transformed into non-orthogonal components without the use of trigonometric functions.

The above enumerated objects are attained by the use of a vector resolver by which a vector, available in terms of its orthogonal components, is transformed from the orthogonal components into non-orthogonal cmponents by an abstract process that does not involve direct treatment of the inherent trigonometry. The resolution is performed by feeding back the properly conditioned sum of the absolute values of the non-orthogonal vector components. The process is defined by three equations which are shown to be mathematically equivalent to true vector resolution.

The exact nature of this invention as well as other objects and advantages thereof will be readily apparent from consideration of the following specification relating to the annexed drawings in which:

FIGS. 1a and 1b show the benefits of a non-orthogonal configuration of fluid injectors;

FIGS. 2a–2c aid in showing a true vector resolution from an orthogonal to a non-orthogonal system;

FIGS. 3, and 4a–4d aid in the proof of the equivalence of true resolution and the resolution of the present invention;

FIG. 5 shows a suitable non-orthogonal injector configuration;

Figure 1A:
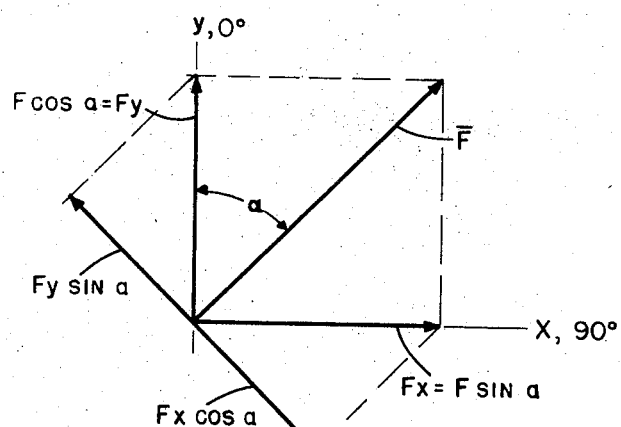
Figure 1B:
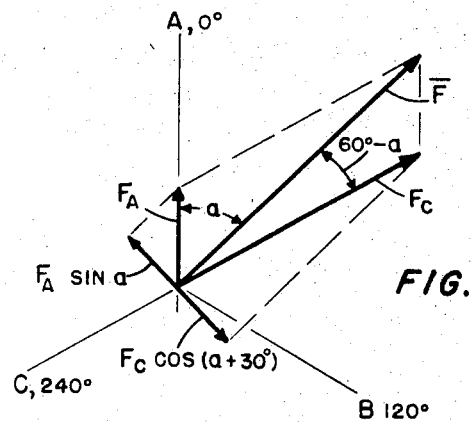

Referring now to FIGS. 1a and 1b, the advantages of a non-orthogonal injector configuration over an orthogonal injector configuration may be seen. In FIG. 1a, $\overline{F}$ represents a force command consisting of the orthogonal components $F_y = F \cos a$ and $F_x = F \sin a$ where F equals the magnitude of the vector $\overline{F}$, and $a$ equals the angle of the resultant vector with respect to the Y axis. In a practical situation, $F_y$ may be in the pitch plane and $F_x$ in the yaw plane of the rocket vehicle. Since the components themselves, rather than the resultant vector, are being generated, it may be readily appreciated that the projection of the components on the resultant vector, that is, $F_y \cos a$ and $F_x \sin a$ provide the resultant $\overline{F}$. However, equal and opposite components $F_y \sin a$ and $F_x \cos a$ are also generated. As may be seen from FIG. 1a, these last named components cancel each other out, however, in the case of a thrust generating system such as a rocket engine with a limited fuel capacity, the generation of these opposing forces represents a substantial waste of energy.

Referring now to FIG. 1b, the same resultant vector $\overline{F}$ is shown and presumed to be available in the form of components $F_A$ and $F_C$ along a system of three non-orthogonal axes A, B and C, each separated by 120°. Again, the projections of $F_A$ and $F_C$ on the resultant vertor $\overline{F}$ produce the actual desired force, and the normal components $F_A \sin a$ and $F_C \cos (a+30)$ represent wasted energy. As may be seen from FIG. 1b, the size of these opposing normal forces and the corresponding wasted energy is greatly diminished from those found in the orthogonal system of FIG. 1a. In fact, the maximum value of the opposing forces in the 3 axis system is reduced by a factor of $$\frac{1}{\sqrt{3}}$$

from the maximum two axes opposing forces. This reduction may yield a significant weight saving in systems where forces are generated by mass expenditure. Increasing the available number of directions for force application beyond those of the three axis system may provide an even greater reduction in energy loss.

As previously mentioned, typical guidance systems provide control signals in the form of orthogonal pitch and yaw components. Accordingly, it is necessary to consider the transformation of vectors such as $F_x$ and $F_y$ of FIG. 1a into equivalent components $F_A$ and $F_C$ (as well as a component $F_B$ in the appropriate case) as shown in FIG. 1b. In order to simplify this transformation, the approximation of the substitution of vector projection for actual vector resolution was tested. By vector projection, it is meant that the output vector components are obtained by multiplying the input vector by the cosine of the angle between the input vector and each output vector component. This projection is easy when the input vector is available in terms of its components, since the angles between the input and output components are merely fixed constants. This is the situation in a typical missile system, where the input vector components are in fact more readily available than the total vector.

When projections are used in place of the actual resolved components, the resultant approximate output is larger than it should be, the largest percentage error being in the smallest component. After considering some of the alternatives, it was decided to improve the projection approximation by subtracting the sum of the absolute values of all of the output components from each individual output component, the sum to be subtracted being bounded by limits to prevent sign reversals by virtue of the subtraction. The subtraction of this limited sum appeared intuitively to provide the desired effect of correcting the smallest output component the most, and the largest output component the least. Interestingly, it was found by calculating special cases that the improved approximation correction yielded a true vector resolution. A general formal proof of this result is provided hereinafter. It should be noted at this point, that for any resultant vector $\overline{F}$, resolution along any of the A, B, or C axes is accomplished by determining the components of the vector $\overline{F}$ parallel to the nearest two of the three available axes. As shown in FIG. 1b, vector $\overline{F}$ is resolved into components along the A axis and the negative extension of the C axis. Similarly, if the angle $a$ is greater than 60°, the resolution will be accomplished by determining the component parallel to the B axis and the negative C axis. Thus, it may be seen that for any resultant vector, in the three axes system, one of the components $F_A$, $F_B$ and $F_C$ will always be zero.

In FIGS. 2a–2c are shown the various possible orientations of the resultant vector $\overline{F}$ and the appropriate resolution along any of the A, B, and C axes or their negative extensions. As may be seen in FIG. 2a, for $a$ between zero and 60°, and between 180° and 240°, the component $F_B$ is equal to zero. In like manner, FIGS. 2b and 2c show the appropriate regions where the components $F_C$ and $F_A$ are equal to zero.

Direct application of the law of sines to the vector triangles shown in FIGS. 2a–2c provides the appropriate relationship between the vector $\overline{F}$ and its components.

Thus, for $0 < a < 60°$ $$F/\sin 120° = -F_C/\sin a = F_A/\sin (60°-a)$$

and for $180° < a < 240°$ $$F/\sin 120° = F_C/\sin (a-180°) = -F_A/\sin (240°-a)$$

or in both ranges:

$F_B = 0$ and $F/\cos 30° = -F_C/\sin a = F_A/\cos (a+30°)$ (1)

Similarly, for $120° < a < 180°$, and for $300° < a < 360°$, $F_C = 0$ and $F/\cos 30° = F_A/\cos (a-30°) = F_B/\sin a$ (2)

and for $60° < a < 120°$, and $240° < a < 300°$ $$F_A = 0 \text{ and } F/\cos 30° = -F_B/\cos (a+30°)$$
$$= -F_C/\cos (a-30°) \quad (3)$$

Referring again to FIG. 1a, it may be seen that $F_y = F \cos a$ and that $F_x = F \sin a$. Therefore, by the use of various well known trigonometric identities, it may be shown that direct relationship exists between $F_A$, $F_B$, and $F_C$, as given by Equations 1 through 3, and the orthogonal components $F_x$ and $F_y$. These relationships would afford a basis for direct transformation from the orthogonal to the non-orthogonal system.

In the present invention, the use of trigonometric transformations and the attendant complexities of mechanization, are avoided entirely by the use of the novel transformation equations presented herein. To this end, consider again the resultant vector $\overline{F}$ shown in FIG. 1b. For an arbitrary angle $a$, it will be shown that the three components of the vector $\overline{F}$, namely, $F_A$, $F_B$, and $F_C$, are given by the relationships $$F_A = 2A' - S(A') \text{ sgn } (A')$$
$$F_B = 2B' - S(B') \text{ sgn } (B')$$
$$F_C = 2C' - S(C') \text{ sgn } (C') \quad (4)$$

where $$S(A') = |F_A| + |F_B| + |F_C| \text{ limited at } 2|A'|$$
$$S(B') = |F_A| + |F_B| + |F_C| \text{ limited at } 2|B'|$$
$$S(C') = |F_A| + |F_B| + |F_C| \text{ limited at } 2|C'| \quad (5)$$

where $$\text{sgn } (\ ) = +1 \text{ when } (\ ) \text{ is positive}$$
$$= -1 \text{ when } (\ ) \text{ is negative} \quad (6)$$

and where $$A' = F \cos a$$
$$B' = F \sin (a-30) = F(\sin a \cos 30 - \cos a \sin 30)$$
$$C' = -F \sin (a+30) = -F(\sin a \cos 30 + \cos a \sin 30) \quad (7)$$

Recognizing the mathematical significance of Equations 6, it is seen that Equations 4 may be rewritten as:

$$F_A = 2A' - \frac{A'}{|A'|} S(A')$$
$$F_B = 2B' - \frac{B'}{|B'|} S(B')$$
$$F_C = 2C' - \frac{C'}{|C'|} S(C') \quad (8)$$

Assume now, that all of the functions given by Equations 5 could be below their limits simultaneously. In this case, they would be identical and by substituting Equations 8 into Equations 5, it may be seen that all of the functions S are given by:

$$S = \left|2A' - \frac{A'}{|A'|}S\right| + \left|2B' - \frac{B'}{|B'|}S\right| + \left|2C' - \frac{C'}{|C'|}S\right| \quad (9)$$

Factoring inside the absolute value brackets, $$S = \left|2A'\left[1 - \frac{S(A')}{2|A'|}\right]\right| + \left|2B'\left[1 - \frac{S(B')}{2|B'|}\right]\right|$$
$$+ \left|2C'\left[1 - \frac{S(C')}{2|C'|}\right]\right| \quad (10)$$

Now, because $S(A')$ is positive and limited to values less than $2|A'|$,
$S(B')$ is positive and limited to values less than $2|B'|$, and
$S(C')$ is positive and limited to values less than $2|C'|$, $$2A'\left[1-\frac{S(A')}{2|A'|}\right]=2A'-\frac{A'}{|A'|}S\geq 0, \ 2A'\geq S\frac{A'}{|A'|}$$

$$2B'\left[1-\frac{S(B')}{2|B'|}\right]=2B'-\frac{B'}{|B'|}S\geq 0, \ 2B'\geq S\frac{B'}{|B'|}$$

$$2C'\left[1-\frac{S(C')}{2|C'|}\right]=2C'-\frac{C'}{|C'|}S\geq 0, \ 2C'\geq S\frac{C'}{|C'|}$$

and, therefore, the larger and smaller terms within the broad absolute value brackets in Equation 10 may be separated from each other, and regrouped with larger terms $2|A'|$, $2|B'|$, $2|C'|$ in one group and the samller terms $$\left|S\frac{A'}{|A'|}\right|, \left|S\frac{B'}{|B'|}\right|, \left|S\frac{C'}{|C'|}\right|$$

in the other group, whereby Equation 9 or 10 may be rewritten as:

$$S=2[|A'|+|B'|+|C'|]-S\left[\left|\frac{A'}{|A'|}\right|+\left|\frac{B'}{|B'|}\right|+\left|\frac{C'}{|C'|}\right|\right] \text{ or}$$

$$S=\tfrac{2}{3}[|A'|+|B'|+|C'|] \quad (11)$$

Figure 3:
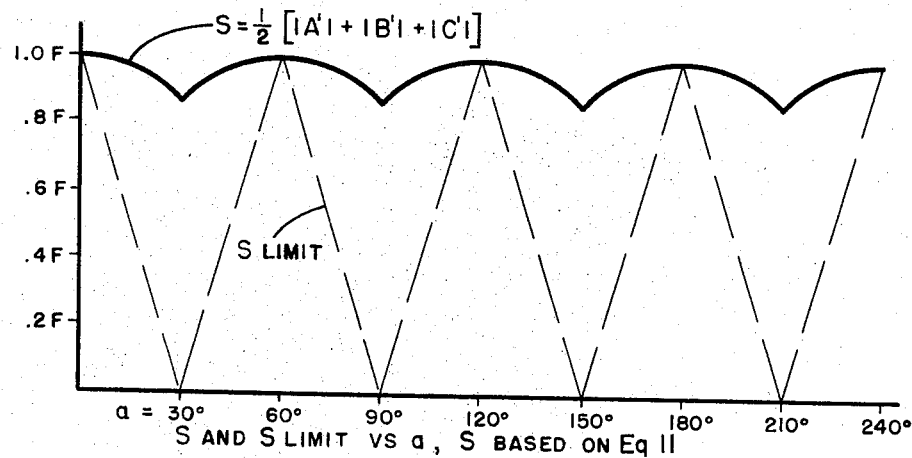

The value of S given by Equation 11 is plotted against the angle $a$ in FIG. 3. In addition, the limiting value of S given by segments of the curves $2|A'|$, $2|B'|$ and $2|C'|$ given by Equations 7 is also plotted. The limit curve is determined by recognizing that the limiting value of S is the smallest of the values of the three possible limits given by Equations 5, and then plotting the segments of $2|A'|$, $2|B'|$ and $2|C'|$ which is the smallest for a given angle $a$.

Upon inspection of FIG. 3, it may be seen that the function S exceeds its specified limits everywhere except at the angles $a=n \cdot 60°$, $n=0, 1 \ldots 6$, at which angles, S equals its limit. Hence, it may be concluded that the hypothesis of Equation 9 is inaccurate, and that at least one of the functions S( ) is at its limit for all values of $a$. Substituting the limits into each of Equations 8, it may be seen that one of the three vector components $F_A$, $F_B$, or $F_C$ is zero, and that the other two components must make up the resultant vector $\bar{F}$ for any value of $a$.

Since it has been concluded that one of the functions S( ) is at or above its limit (that is $F_A$, $F_B$, or $F_C$ equals zero for all $a$), then the other two are below their respective limits and are given by:

for $F_A=0$ $$S(B')=S(C')=S\left|2B'-\frac{B'}{|B'|}S\right|+\left|2C'-\frac{C'}{|C'|}S\right|$$

Proceeding as in Equation 10

$$S=|2B'|+|2C'|-\left|\frac{B'}{|B'|}S\right|-\left|\frac{C'}{|C'|}S\right|$$

$$S=\tfrac{2}{3}[|B'|+|C'|] \quad (12)$$

Similarly, for $F_B=0$, $$S=\tfrac{2}{3}[|A'|+|C'|] \quad (13)$$

and for $F_C=0$ $$S=\tfrac{2}{3}[|A'|+|B'|] \quad (14)$$

Figure 4A:
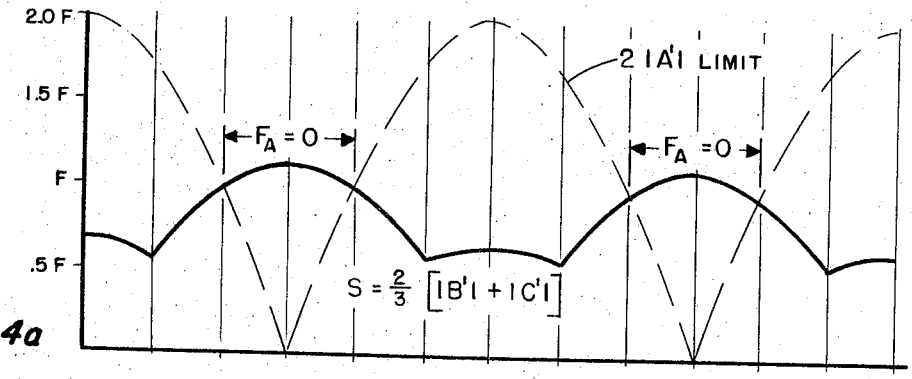
Figure 4B:
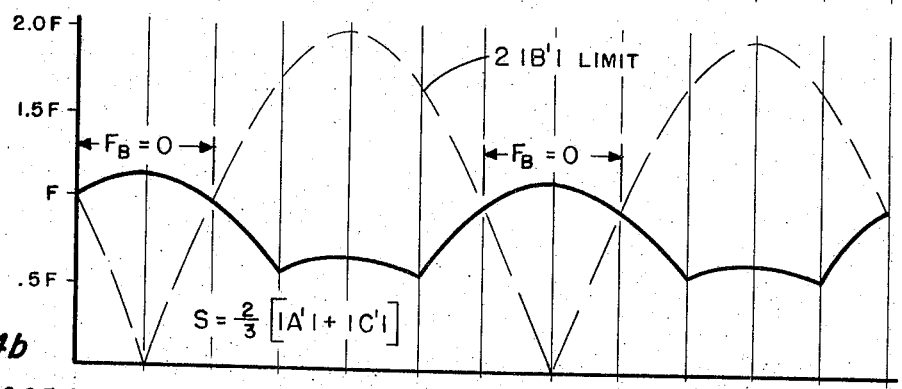
Figure 4C:
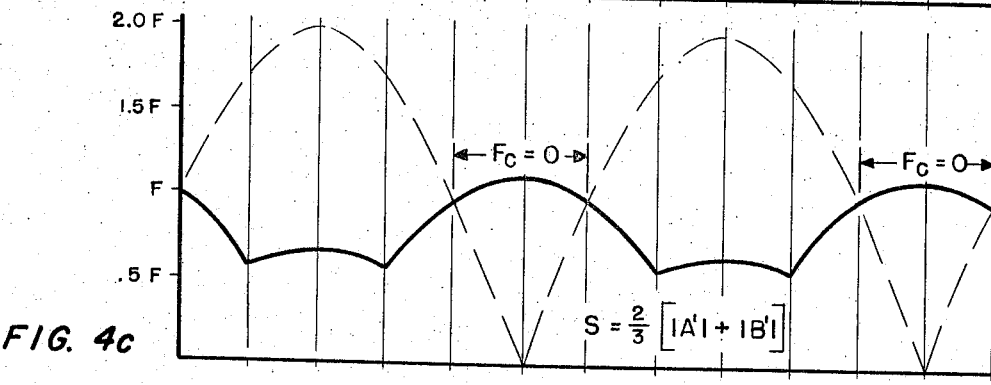

The values of the S functions given by Equations 12–14 are plotted in FIGS. 4a–4c together with the limit curves $2|A'|$, $2|B'|$ and $2|C'|$.

Figure 4D:
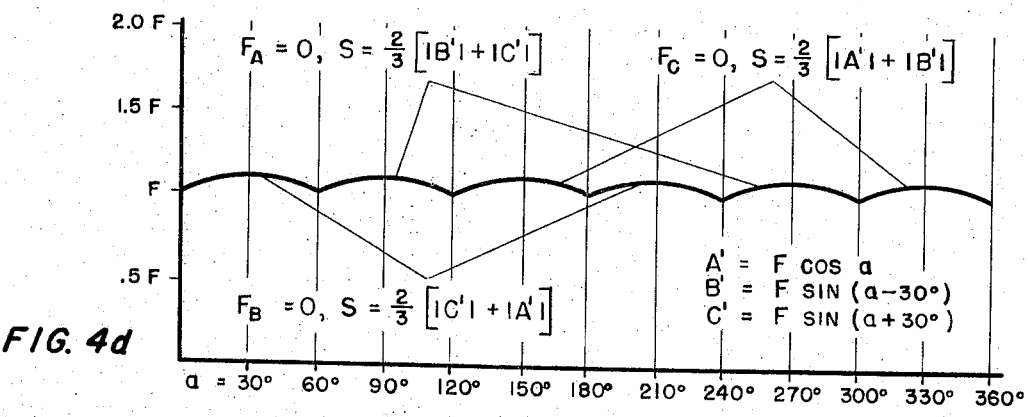

The meaningful portions of the curves are in the regions where S exceeds the plotted limit value, since Equations 12–14 are written under the conditions that one of the functions $\tilde{S}$ equals or exceeds its limit which in turn imposes the condition that $F_A$, $F_B$, or $F_C$ equals zero. When the segments of the S curves where $F_A$, $F_B$, and $F_C$ equals zero are pieced together, the composite curve spans the total range of $a$ without overlap as shown in FIG. 4d.

Using the results shown in FIG. 4d, Equations 8 may be rewritten as follows:

for $0°<a<60°$, and $180°<a<240°$:

$F_B=0$ $$F_C=2C'-\frac{C'}{|C'|}S(C')=2C'-\tfrac{2}{3}\frac{C'}{|C'|}(|C'|+|A'|)$$

$$=\tfrac{2}{3}C'\left(2-\left|\frac{A'}{C'}\right|\right)$$

$$F_A=2A'-\frac{A'}{|A'|}S(A')=2A'-\tfrac{2}{3}\frac{A'}{|A'|}(|C'|+|A'|)$$

$$=\tfrac{2}{3}A'\left(2-\left|\frac{C'}{A'}\right|\right) \quad (15)$$

Similarly, for $60°<a<120°$ and $240°<a<300°$ $F_A=0$ $$F_B=\tfrac{2}{3}B'\left(2-\left|\frac{C'}{B'}\right|\right)$$

$$F_C=\tfrac{2}{3}C'\left(2-\left|\frac{B'}{C'}\right|\right) \quad (16)$$

and, for $120°<a<180°$, and $300°<a<360°$ $F_C=0$ $$F_A=\tfrac{2}{3}A'\left(2-\left|\frac{B'}{A'}\right|\right)$$

$$F_B=\tfrac{2}{3}B'\left(2-\left|\frac{A'}{B'}\right|\right) \quad (17)$$

An examination of the signs of $A'$, $B'$, and $C'$ for various values of $a$ reveals that $$\left|\frac{C'}{A'}\right|=-\frac{C'}{A'}\begin{cases}0°<a<60°\\180°<a<240°\end{cases} \ B=0 \text{ region}$$

$$\left|\frac{B'}{C'}\right|=-\frac{B'}{C'}\begin{cases}60°<a<120°\\240°<a<240°\end{cases} \ A=0 \text{ region}$$

$$\left|\frac{B'}{A'}\right|=-\frac{B'}{A'}\begin{cases}120°<a<180°\\300°<a<360°\end{cases} \ C=0 \text{ region}$$

(18)

Therefore $$F_B=0: \ F_C=\tfrac{2}{3}(2C'+A'), \ F_A=\tfrac{2}{3}(2A'+C')$$
$$F_A=0: \ F_B=\tfrac{2}{3}(2B'+C'), \ F_C=\tfrac{2}{3}(2C'+B')$$
$$F_C=0: \ F_C=\tfrac{2}{3}(2A'+B'), \ F_B=\tfrac{2}{3}(2B'+A')$$

(19)

Substituting Equations 7 into Equations 19

$F_B=0$ $$\frac{F_C}{F}=\tfrac{2}{3}[-2\sin(a+30)+\cos a]=\tfrac{2}{3}(-2\sin a\cos 30$$

$$-2\cos a\sin 30+\cos a)=\tfrac{4}{3}\sin a\cos 30=\frac{\sin a}{\cos 30} \quad (20)$$

$$\frac{F_A}{F}=\tfrac{2}{3}[2\cos a-\sin(a+30)]=\tfrac{2}{3}(2\cos a-\sin a\cos 30$$

$$-\cos 30-\cos a\sin 30)$$

$$=\frac{1}{\cos 30}(\cos a\cos 30-\tfrac{2}{3}\sin a\cos^2 30)$$

$$=\frac{1}{\cos 30}(\cos a\cos 30-\sin a\sin 30)$$

$$=\frac{\cos(a+30)}{\cos 30} \quad (21)$$

Similarly $F_A = 0$ $$\frac{F_B}{F} = -\frac{\cos(a+30)}{\cos 30} \quad (22)$$

$$\frac{F_C}{F} = -\frac{\cos(a-30)}{\cos 30} \quad (23)$$

and for $F_C = 0$ $$\frac{F_A}{F} = \frac{\cos(a-30)}{\cos 30} \quad (24)$$

$$\frac{F_B}{F} = \frac{\sin a}{\cos 30} \quad (25)$$

Equations 20–25 are in fact the same relationships as those given by Equations 1 through 3, and therefore may be seen to represent the exact vector components $\overline{F}$. Therefore, it may be concluded that the relationships of Equation 4 represent an exact vector transformation from the orthogonal to the non-orthogonal coordinate system.

FIG. 5 shows a typical fluid injector configuration in accordance with the present invention. Six injectors $A_1$, $A_2$, $B_1$, $B_2$, $C_1$, and $C_2$ are disposed at 60° intervals around the periphery of the main rocket nozzle 11. Shown also is the coordinate system $A-B-C$ and the resultant vector $\overline{F}$. Suitable means are necessary to translate the components shown in FIG. 1b into commands for the various injectors to produce the composite force $\overline{F}$.

Figure 6:
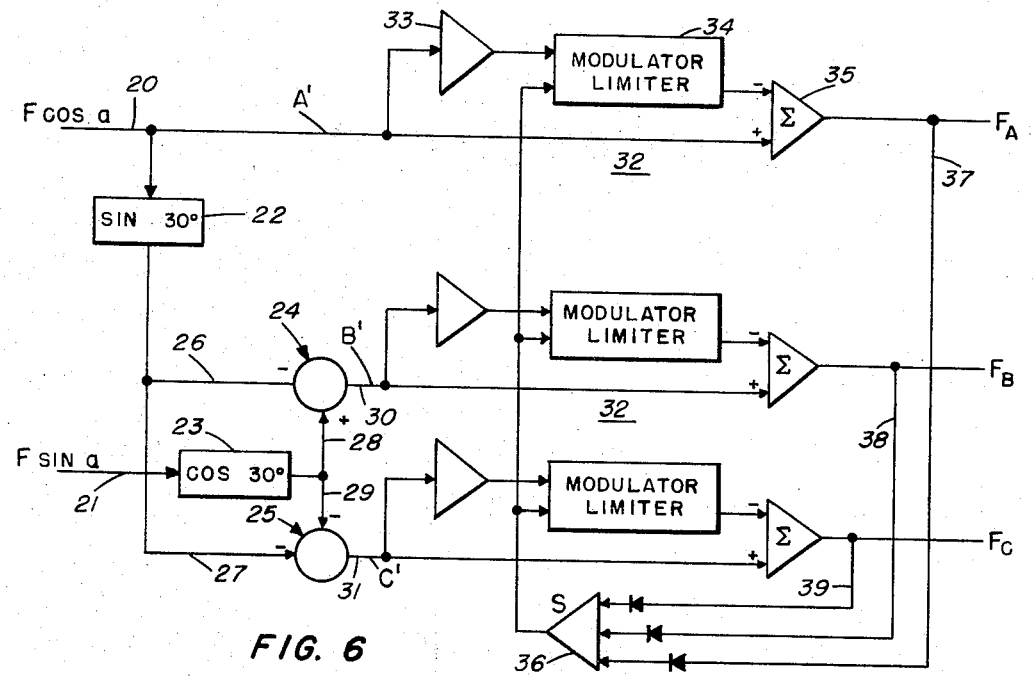
FIG. 6 shows a simple mechanization of a resolution system for use with the configuration of FIG. 5.

A suitable mechanization of the transformations defined by Equations 4 is shown in FIG. 6. The system is arranged for use with a fluid injection thrust vector control system employing hydraulically interlocked servos, three servos providing control over six injectors arranged as shown in FIG. 5. The circuitry shown is entirely AC, although other embodiments may be arranged for operation with direct current.

Referring to FIG. 6, inputs 20 and 21 provide error signals from a suitable guidance system in the form of the orthogonal components of the resultant $\overline{F}$, i.e., $F_y = F \cos a$, and $F_x = F \sin a$.

From Equations 1–4, it is seen that a direct transformation for $F_x$ and $F_y$ into A', B' and C' may be accomplished by a properly scaled algebraic summation. Note that the signal at terminal 20 is already equal to the function A. The circuitry required to produce the functions B' and C' comprises constant multiplier potentiometers 22 and 23, and adding circuits 24 and 25. As may be seen, the signal appearing on leads 26 and 27 is equal to $F \cos a \sin 30$. Similarly, the signal appearing on leads 28 and 29 is equal to $F \sin a \cos 30$ by virtue of the constant multiplication of potentiometer 23. These signals are combined in the proper sense by summers 24 and 25 to produce on leads 30 and 31, respectively, the functions B' and C'. Each of the functions A', B' and C' are provided to an identical channel 32, which comprises a suitable amplifier 33, a modulator-limiter 34, and a summing circuit 35. Modulator-limiters 34 are conventional modulators in which the feedback signal S provided by summing circuit 36 is limited at the level of the modulator reference signal in the normal manner. The reference signal for each modulator-limiter is provided by amplifier 33. In addition, to establish the feedback signal limits, the modulator-reference signal controls the sign of the feedback signal.

As previously indicated and as shown by Equations 4, in order to complete the generation of the signals $F_A$, $F_B$ and $F_C$ a summation of the absolute values of the output signals must be fed back to each channel. To this end, the signals $F_A$, $F_B$ and $F_C$ are connected to summing amplifier 36 by leads 37, 38 and 39, respectively. The signal S appearing at the output of amplifier 36 is in the form of a rectified AC signal and, as indicated, is fed to each modulator-limiter 34 where it is limited and properly signed for combination with the functions A', B' and C', respectively.

The functions $F_A$, $F_B$ and $F_C$ appearing at the output of the amplifiers 35 may be connected to a suitable system of hydraulically interlocked servos (not shown). In such a system three servos would provide control over six injectors. Positive servo displacements would operate three of the injectors and negative displacements would operate the other three.

Figure 7:
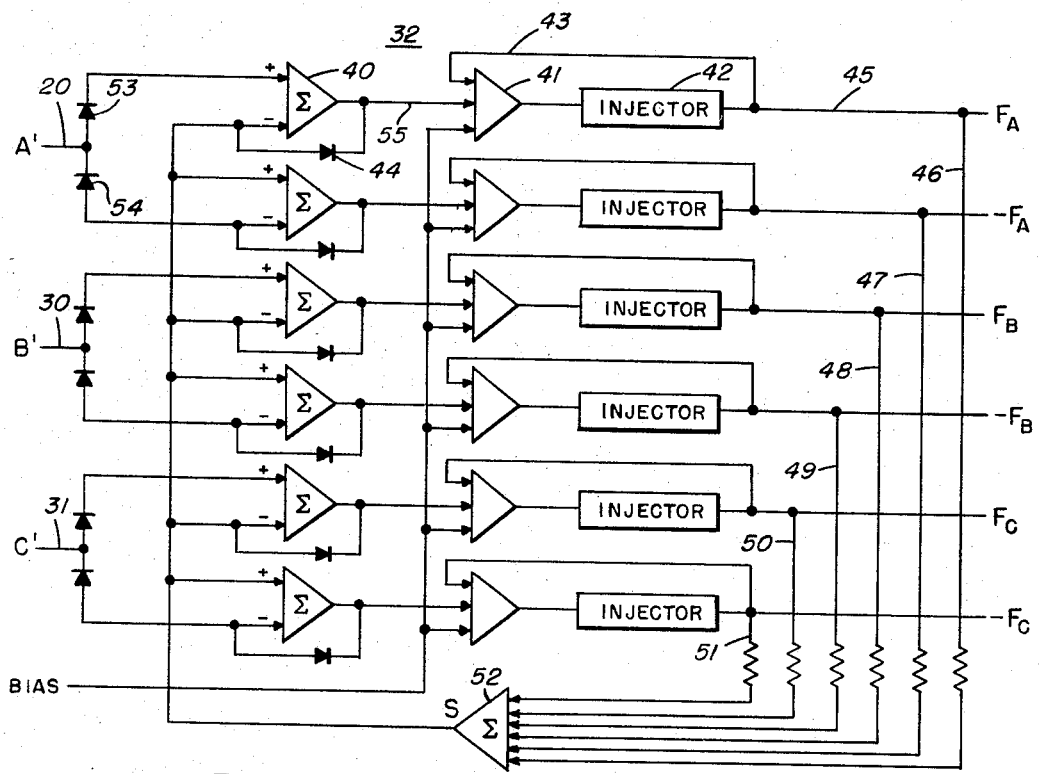
FIG. 7 shows a modification of FIG. 6 including the injector servos.

FIG. 7 shows an alternative embodiment of the system of FIG. 6 in which DC circuitry is employed and in which six (6) separate servo systems provide control over the individual injectors. Here, it is assumed that in a manner entirely analogous to that of FIG. 6, the functions A', B' and C' are generated and are made available over leads 20, 30 and 31, respectively. In this system there are six (6) identical channels 32, each including a summing amplifier 40, a servo amplifier 41, a fluid injector 42 and a suitable feedback control path 43 for the injector servo system. A suitable diode 44 is placed across the summing amplifier 40 in each channel 32 to allow only positive signals to be provided as inputs to the injector servos.

As may be seen, in the embodiment to FIG. 7, separate channels are provided for the positive and negative values of each of the force components $F_A$, $F_B$ and $F_C$. A signal proportional to the appropriate component may be made available at the output 45 of each channel by a suitable output transducer (not shown). Again, in order to comply with Equation 4, each of the output signals is fed back over circuits 46 through 51, respectively, to a suitable summing amplifier 52, the output of which represents the feedback summation S provided as one of the inputs to summing amplifier 40 in each of channels 32. Since each servo mechanism displaces only in the positive direction, because of diodes 44 inserted across each summing amplifier, no special circuitry is necessary to insure that the signal S represents the sum of the absolute values of the output signals. Therefore, the signal S may be generated simply by a summation of the output functions through the resistors in networks 46 through 51. The signal S appearing at the output of amplifier 52 is fed back to each of the channels 32 with the appropriate sign in order to satisfy Equation 4.

As shown, each of inputs 20, 30 and 31 are provided to a pair of diodes 53 and 54 for proper distribution to one of two channels 32. For example, positive values of the function A' appearing on lead 20 are fed through diode 53 to summing amplifier 40 in the positive $F_A$ channel, while negative values of the function A' are fed through diode 54 to amplifier 40 in the negative $F_A$ channel. In this way, operation of the proper one of the $F_A$ and $-F_A$ channels is assured.

The input diodes 53 and 54 serve an additional purpose if it is necessary to incorporate into the injector system a feature which is generally denoted as provision for fluid dump. By the fluid dump feature, it is meant that each of the fluid injectors is continually operating at a certain level, control of the vehicle being provided by increasing or decreasing the output of one or more injectors. This is an advantageous feature since it allows the complete utilization of the mass loaded for use by the control system and in addition allows all of the injectors to be activated continuously thereby decreasing the probability of failure of inactive injectors due to high temperature, high velocity ejectant.

In order to provide the fluid dump feature, a suitably controlled and programmed biasing signal is provided over lead 55 to each of the servo amplifiers 41 in the channel 32. This signal provides continuous operation for each of the injectors 42, but since it increases the output of all of the servos simultaneously, it raises the possibility of undesirable loop gain in each of the channels 32. In the absence of the diodes 53 and 54, this bias would elevate the operating point of each channel thereby effectively changing the operation of each channel from class B to class A, whereby both positive and negative signals would be fed through all channels. The net effect of this biasing into class A operation would be an undesirable gain increase of 2 in each channel. Therefore, it may be seen that an addition to the steering function provided by diodes 53 and 54 the additional function of gain control is provided.

The embodiment of FIG. 7 may be converted from DC to AC operation by substituting for the diodes transistor circuits employing AC power excitation, the signal flow being controlled in accordance with phase coincidence between the input and excitation.

Figure 8:
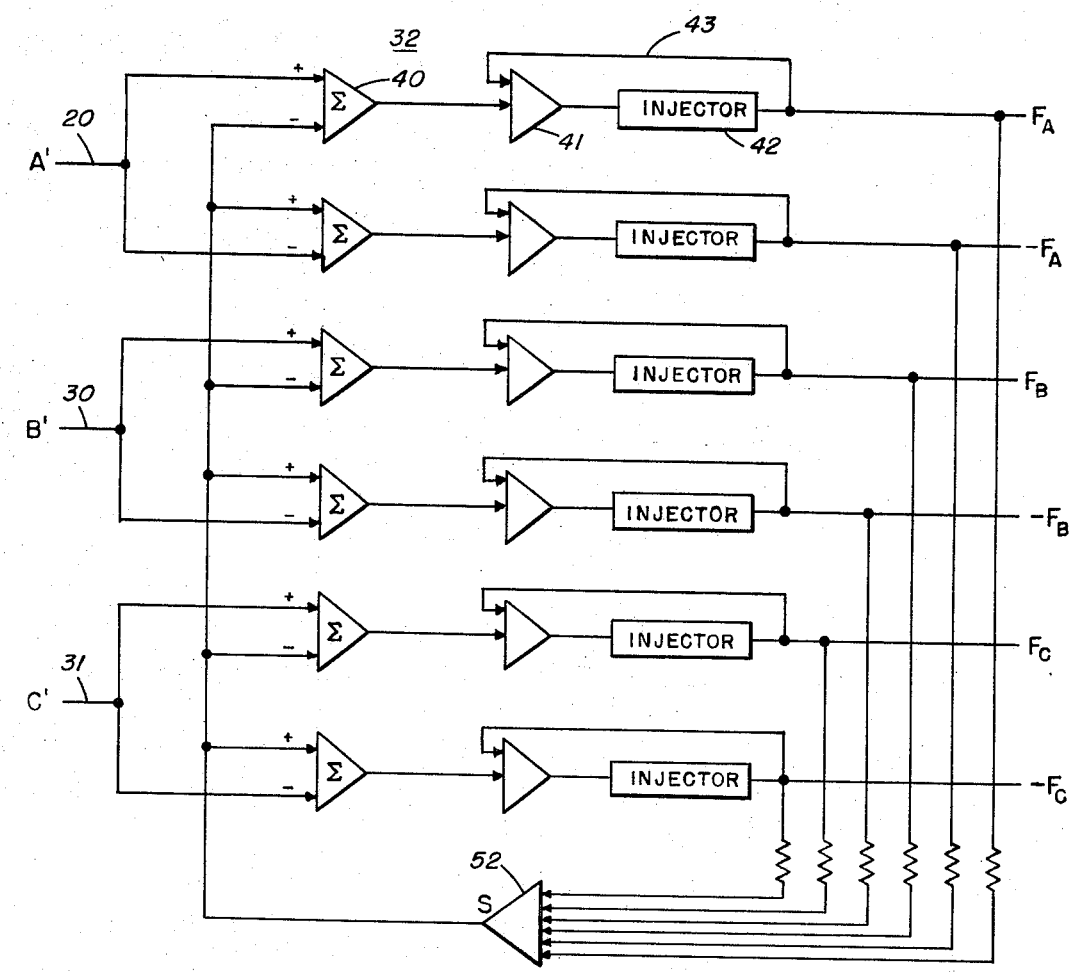
FIG. 8 shows a modification of FIG. 7.
Figure 9:
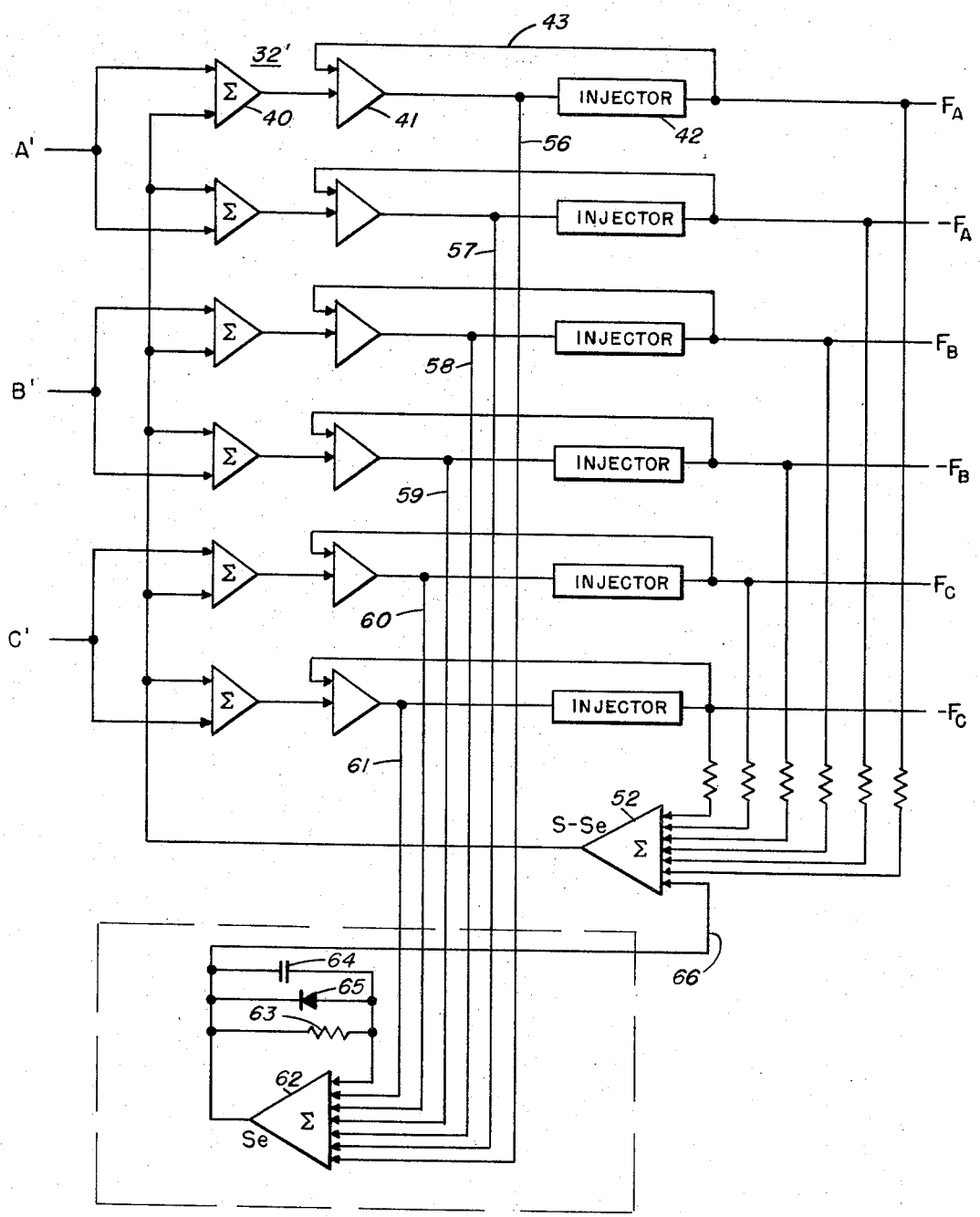
FIG. 9 shows an embodiment of FIG. 8 including means to compensate for failure of one of the injectors of FIG. 5.

FIG. 8 shows a modification of the system of FIG. 7 which may be used if there is no requirement for the fluid dump feature and if the inector servos are provided with mechanical stops or other inherent limits which prevent negative travel. The circuitry of FIG. 9 is precisely the same as that of FIG. 8 except in each of the channels 32' no diodes 44 are necessary, and in each of the input circuits the diodes 53 and 54 may be eliminated. In this embodiment, since the servo travel is inherently limited to positive directions, the same functions are provided inherently that are provided by the diodes of FIG. 7. It should be noted that in this embodiment, either AC or DC operation is possible.

FIG. 9 shows a modification of the embodiments of FIG. 8 useful in overcoming certain inherent problems which arise in the operation of thrust vectoring control systems.

If one of the fluid injectors in the system fails completely open, the result will be a total failure of the entire system. The only cure for this type of failure is the provision of an injector which cannot fail open. If the injectors are such that they can only fail in their closed positions, the failure may be tolerable. It will be shown that the systems depicted in FIGS. 6 through 8 suffer a gain change when an injector fails in its closed position. The gain changes by a factor of 3 when the failed injector is in line with the input command and thus is carrying the control burden entirely. This change in gain may be eliminated by the addition of the gain recovery circuit shown in FIG. 9. In addition, this gain recovery network also serves to increase the available gain when overpoweringly large commands are applied to the thrust vectoring system itself, as in the event of an unexpected large position disturbance.

The basic configuration of FIG. 9 is substantially the same as that of FIG. 8, although it should be recognized that the diode embodiment shown in FIG. 7 may be readily adapted to include the novel features of FIG. 9. The additional features shown in FIG. 9 include an additional feedback path provided from each of channels 32' provided by leads 56 through 61, respectively. These additional feedback signals are added by a suitable summing amplifier 62 to provide an error signal $S_e$. Diode 65 in the feedback path of summing amplifier 62 assures that the output of the amplifier will represent the absolute value of the sum of the feedback signals. In addition, an RC circuit comprising capacitor 64 and resistor 63 may be provided in a feedback path to disable the gain increase function with a normal short duration transient which might be otherwise confused with a system failure. The output of summing amplifier 62 is fed to summing amplifier 52 over lead 66 and is then added as before to provide the feedback signal S. In the following mathematical analysis, it will be shown that the subtraction of the servo error absolute value sum from the absolute value feedback sum properly compensates for the gain loss due to an injector failure. The analysis will cover only the critical region within plus or minus 30 degrees of a failed injector which is commanded to operate. It should be noted that the present system makes no compensation for failed injector unless it is commanded to operate. This is because the simple embodiments of FIGS. 7 through 9 do not suffer a gain change unless a failed injector is commanded to operate or in the absence of a persistent large command.

Using the results of Equations 19–25, the vector components for normal operation in the region $-30 < a < 30$ are given by $-30 < a < 0$ $$F_A = \tfrac{2}{3}(2A' + B') = \frac{F \cos (a-30)}{\cos 30}$$

$$F_B = \tfrac{2}{3}(2B' + A') = \frac{F \sin a}{\cos 30}$$

$$F_C = 0 \qquad (26)$$

$0 < a < 30$:

$$F_A = \tfrac{2}{3}(2A' + C') = \frac{F \cos (a+30)}{\cos 30}$$

$$F_B = 0$$

$$F_C = \tfrac{2}{3}(2C' + A') = -\frac{F \sin a}{\cos 30} \qquad (27)$$

Therefore, the component in the A direction is $$F_A - F_B \cos 60 - F_C \cos 60 = F \cos a \qquad (28)$$

However, when the A injector fails to open upon command, the system behaves as if A had changed and the vector components become (see Equations 16):

$$F_A = 0, \left[ F_B = \tfrac{2}{3}B'\left(2 - \left|\tfrac{C'}{B'}\right|\right), F_C = \tfrac{2}{3}C'\left(2 - \left|\tfrac{B'}{C'}\right|\right) \right]$$

or $$F_B = \tfrac{2}{3}F[2 \sin (a-30) + \sin (a+30)]$$

$$F_C = \tfrac{2}{3}F[2 \sin (a+30) + \sin (a-30)] \qquad (29)$$

Therefore, the vector component in the A direction with $F_A = 0$ becomes $$-F_B \cos 60 - F_C \cos 60$$
$$= \tfrac{1}{3}F[2 \sin (a-30) + \sin (a+30)] + \tfrac{1}{3}F[2 \sin (a+30) + \sin (a-30)]$$
$$= \tfrac{2}{3}F \cos a \qquad (30)$$

It is seen then that failure of the A injector results in a reduction of the desired component by a factor of ⅔.

By subtracting the absolute value of the sum of the injector servo error signals (or the positive valued error signal summation $S_e$ shown in FIG. 9) this gain change may be eliminated.

When $F_A = 0$, as when the $A_1$ injector of FIG. 5 fails, signal S is $$S = |F_B| + |F_C| = \left|2B' - \frac{B'}{|B'|}S\right| + \left|2C' - \frac{C'}{|C'|}S\right| \qquad (31)$$

Simplifying as previously, $$S = |2B'| + |2C'| - \left|\frac{B'}{|B'|}S\right| - \left|\frac{C'}{|C'|}S\right| = |2B'| + |2C'|$$
$$- S\left|\frac{B'}{|B'|} + \frac{C'}{|C'|}\right| = 2[|B'| + |C'| - S]$$

or $$S = \tfrac{2}{3}[|B'| + |C'|] \qquad (32)$$

Upon the introduction of the gain recovery means of FIG. 9, the output of summer 52 becomes $S - S_e$, and Equations 4 become $$F_A = 2A' - \frac{A'}{|A'|}(S - S_e)(A')$$

$$F_B = 2B' - \frac{B'}{|B'|}(S - S_e)(B')$$

$$F_C = 2C' - \frac{C'}{|C'|}(S - S_e)(C') \qquad (33)$$

with the limits of Equations 5 applied to $(S - S_e)(A')$ or $(S - S_e)(B')$ or $(S - S_e)(C')$.

11

If the $A_1$ injector has failed, then $Se=|A'|$, A being the input to the failed channel. Substituting $Se=|A'|$ into equations $$F_B = 2B'\left[1 - \tfrac{1}{3}\left|\frac{|B'|+|C'|+|A'|}{|B'|}\right|\right]$$

$$F_C = 2C'\left[1 - \tfrac{1}{3}\left|\frac{|B'|+|C'|+|A'|}{|C'|}\right|\right] \quad (34)$$

For $$-30 < a < 30$$

$$|A'| = F|\cos a| = F \cos a \quad (35)$$

$|B'| = F|\sin a \cos 30 - \cos a \sin 30| = F(-\sin a \cos 30 + \cos a \sin 30)$ $|C'| = F|-\sin = \cos 30 - \cos a \sin 30| = F(\sin a \cos 30 + \cos a \sin 30)$ $|B'| + |C'| = F \cos a$, Therefore $|B'| + |C'| - |A'| = F \cos a - F \cos a = 0$, and $$F_B = 2B', \quad F_C = 2C' \quad (36)$$

The output component in the A direction becomes $$-F_B \cos 60 - F_C \cos 60$$
$$= 2(B' + C') \cos 60 = B' + C' \quad (37)$$

Substituting now Equations 7 into Equation 37, $-F_B \cos 60 - F_C \cos 60 = F(\sin a \cos 30 - \cos a \sin 30)$
$-F(\sin a \cos 30 + \cos a \sin 30)$ and simplifying, $$-F_B \cos 60 - F_C \cos 60 = -F \cos a$$

From Equation 37, therefore the normal output component in the A direction is equal to $F \cos a$.

Thus, it is seen that addition of the gain recovery circuit of FIG. 9 exactly compensates for the effect of an injector which fails in the closed position.

In the foregoing specification, the theory of the present invention has been explained in detail, and a number of suitable mechanizations embodying the theory have been disclosed and described. It should be recognized, however, that a wide variety of other uses are available for systems embodying the vector resolution technique of the present invention, and that a number of modifications of the circuitry shown in FIGS. 6 through 9 are possible. For example, if it is desired, the absolute value feedback sum generated by summing amplifier 52s in FIGS. 7 through 9 may be generated by connecting outputs 46 through 51 to the output of the amplifiers 40 preceding the injector servo systems. An advantage of feeding back from such a point is the reduction of gain raviations which would result when the servos reach their inherent limits or when a particular servo fails.

In addition, the applicability of the resolution method described herein may be directly extended for operation with systems using more than six injectors. Various other modifications are contemplated and may obviously be made by those skilled in the art without departure from the spirit and scope of the present invention as defined by the appended claims.

What is claimed is:
1. A vector resolver for determinig the components of a vector in a non-orthogonal coordinate system comprising:
   means to generate a signal analog representative of the vector;
   means responsive to the vector analog to generate a number of signal analogs of the projection of the vector onto each of the axes of the non-orthogonal coordinate system;
   separate subtracting means connected to the projection signal generating means for each projection;
   separate output means connected to each subtracting means;

12 means connected to the output means to generate the sum of the absolute values of the output signals; and
   means connecting the output of the summing means to each of the subtracting means.

2. The vector resolver of claim 1 where the subtracting means includes:
   means to limit the subtrahend to be less than or equal to the minuend, whereby the remainder signal provided to the output means is always greater than or equal to zero.

3. The vector resolver of claim 2 where the sum of the output signals is subtracted by each subtracting means from each of the respective projection analogs.

4. The vector resolver of claim 1 where the vector analog generating means operates with reference to a cartesian coordinate system and generates a number of signals each representative of one of the vector components therein.

5. The vector resolver of claim 4 where the projection analog generator comprises:
   means to generate signal analogs of the projection of the cartesian components onto each of the non-orthogonal axes; and
   means to provide a number of signals each representative of the sum of the cartesian component projections on one of the non-orthogonal axes.

6. The vector resolver of claim 5 where the subtracting means includes:
   means to limit the subtrahend to be less than or equal to the minuend, whereby the remainder signal provided to the output means is always greater than or equal to zero.

7. The vector resolver of claim 6 where each subtracting means is arranged to subtract the sum of the absolute values of the output signals from the respective projections onto the non-orthogonal axis.

8. The vector resolver of claim 7 where the non-orthogonal coordinate system comprises N axes and their negative extensions, each separated by $(N/360°)$.

9. The vector resolver of claim 8 where N equals 3.

10. The vector resolver of claim 9 where the projection signal generating means comprises means to multiply the cartesian component signals by a constant factor.

11. In a thrust vectoring control system for a rocket motor having a plurality of deflection means disposed at equal distances around the periphery of the rocket motor, forming thereby a non-orthogonal coordinate system having its origin on the longitudinal axis of the motor and its coordinate axes passing through each deflection means, a system to control the deflection means which comprises:
   means to generate a vector error signal;
   means to resolve the error signal into components along each of the non-orthogonal coordinate axes; and
   means to actuate each deflection means in accordance with the component of the error signal along its respective non-orthogonal axis;
   means connected to the vector generating means to provide a number of signal analogs of error signal vector projection onto each non-orthogonal coordinate axes;
   a plurality of channels equal in number to the number of non-orthogonal coordinate axes, each connected to receive and process one of the projection signal analogs;
   each channel including a subtracting means;
   deflection control means connected to the output of the subtracting means;
   means connected to the control means to monitor the control signal provided thereto;
   means connected to the monitoring means to generate the sum of the absolute values of the control signals; and
   means to provide the absolute value summation as one input of each subtracting means, a second input being provided by the respective projection signal analogs.

12. The invention of claim 11 where the vector error signal is available in terms of its orthogonal components; and where the projection signal generating means comprises:
means to generate signals representing the projection of each of the orthogonal components onto each of the non-orthogonal axes; and
means to generate a plurality of signals each representative of the sum of the projections of the orthogonal components onto one of the non-orthogonal axes.

13. The invention of claim 12 further including means to limit the absolute value summation so that the subtractor output is always greater than or equal to zero.

14. The invention of claim 13 where the limiting means comprises:
modulator-limiter means in each channel to receive the absolute value summation responsive to the value of the projection signal to limit the absolute value summation to be less than or equal to the projection signal; and
means connecting the output of the modulator limiter as one input to the subtracting means.

15. The invention of claim 13 where the limiting means comprises:
unidirectional conducting means in each channel to prevent a negative output from the subtracting means.

16. The invention of claim 15 wherein a separate deflection means is associated with each non-orthogonal coordinate axis and its negative extension and where each channel includes means to selectively actuate the deflection means corresponding to the axis or its extension in accordance with the sense of the projection on that particular axis.

17. The invention of claim 16 where each channel is comprised of two identical sub-channels, each including a subtracting means, deflection control means, monitoring means, and limiting means, one sub-channel being for the non-orthogonal axis and the other for the negative extension thereof; and
where the selective actuating means comprises means to direct negative projections to the sub-channel for the negative extension and positive projections to the sub-channel for the axis itself.

18. The invention of claim 17 including
means connected to each sub-channel to provide a deflection control signal to each deflection control means independent of the control signal generated by the sub-channels themselves.

19. The invention of claim 11 including means responsive to the failure of a deflection means to provide a correction signal to the subtractor for each channel.

20. The invention of claim 19 where the correction is included in the absolute value summation.

21. The invention of claim 20 including means to limit the absolute value summation so that the control signal is always greater than or equal to zero.

22. The invention of claim 21 where a separate deflection means is associated with each non-orthogonal coordinate axis and its negative extension and where each channel includes means to selectively actuate the deflection means corresponding to the axis or its extension in accordance with the sense of the projection on the particular axis.

23. The invention of claim 22 where each channel is comprised of:
two identical sub-channels, each including a subtracting means,
deflection control means,
monitoring means, and
limiting means,
one sub-channel being for the axis and the other for its negative extension, and
where the selective actuating means comprises means to direct negative projection signals to sub-channel for the negative extension, and to direct positive projection signals to the sub-channel for the axis itself.

24. The invention of claim 23 including means connected to each sub-channel to provide a deflection control signal to each deflection control means independent of the control signals generated by the sub-channels themselves.

25. The invention of claim 24 where the limiting means comprises:
unidirectional conducting means in each channel to prevent a negative output from the subtracting means.

26. The invention of claim 19 wherein the correction signal generating means includes:
means connected to the output of each subtractor to monitor the output thereof;
means to provide a summation of the outputs of the monitoring means; and
means connecting the output of the last named summation means as an input to the absolute value summation means.

27. The invention of claim 26 including:
high pass filter means connected to the output of the subtractor summing means to eliminate high frequency transient signals from the correction signal.

28. The invention of claim 24 wherein the correction signal generating means includes:
means connected to the output of each subtractor to monitor the output thereof;
means to provide a summation of the outputs of the monitoring means; and
means connecting the output of the last named summation means as an input to the absolute value summation means.

29. The invention of claim 28 including:
high pass filter means connected to the output of the subtractor summing means to eliminate high frequency transient signals from the error signal.

30. A vector resolver for converting a vector available in its cartesian components $F_x$ and $F_y$ into its corresponding components $F_A$, $F_B$ . . . $F_N$ in a non-orthogonal coordinate system comprising:
means to generate signals representing the projection of each of the components $F_x$ and $F_y$ onto each of the axes A, F . . . N;
means to generate signals A′, B′ . . . N′ representing the sums of the projections of $F_x$ and $F_y$ onto each of the A, B . . . N axes;
a separate channel for each of the components $F_A$, $F_B$ . . . $F_N$;
means connecting the signals A′, B′ . . . N′, respectively, to the input of one of the channels;
means in each channel to double the input;
subtracting means in each channel having as one input thereof the output of the doubling means;
output means in each channel connected to each subtracting means;
means connected to all of the output means to generate the sum of the absolute values of the output signals; and
means to provide the sum of the absolute values of the output signals as the second input to each of the subtracting means.

31. The invention of claim 30 further including:
means to limit the absolute value summation signal so that the output of the subtracting means is always greater than or equal to zero.

32. The invention of claim 31 where the limiting means comprises:
modulator limiter means in each channel connected to the absolute value summation signal and responsive to the value summation signal to be less than or equal to the projection signal; and means connecting the output of the modulator limiter as one input to the subtracting means.

33. The invention of claim 31 where the limiting means comprises:

unidirectional conducting means in each channel to prevent a negative output from the subtracting means.

34. The invention of claim 33 where each channel is comprised of two identical sub-channels, each including:

subtracting means,
output means,
limiting means, and
means connecting the sub-channel as an input to the absolute value summation generator;
one sub-channel being for the non-orthogonal axis itself and the other for the negative extension thereof and further including means to direct negative values of A', B' ... N' to the sub-channel for the negative extension and positive values of A', B' ... N' to the sub-channel for the axis itself.

35. The invention of claim 32 where the non-orthogonal coordinate system comprises three axes, A, B, and C, each separated by 120°.

References Cited

UNITED STATES PATENTS

| | | | |
|---|---|---|---|
| 2,943,822 | 7/1960 | Hamilton | 244—77 |
| 3,115,318 | 12/1963 | Caillette | 244—77 |

FERGUS S. MIDDLETON, *Primary Examiner.*